United States Patent
Krekel et al.

(10) Patent No.: US 12,497,025 B2
(45) Date of Patent: Dec. 16, 2025

(54) METHOD FOR MANEUVERING A VEHICLE HAVING A TRAILER COUPLING IN A PARKING SPACE

(71) Applicant: Ford Global Technologies, LLC, Dearborn, MI (US)

(72) Inventors: Markus Krekel, Wermelskirchen (DE); Florian Vieten, Meerbusch (DE); Andreas Giersiefer, Leverkusen (DE); Elena Lazaridis, Cologne (DE); Paul Jamnicki, Bonn (DE)

(73) Assignee: Ford Global Technologies, LLC, Dearborn, MI (US)

( * ) Notice: Subject to any disclaimer, the term of this patent is extended or adjusted under 35 U.S.C. 154(b) by 242 days.

(21) Appl. No.: 18/449,944

(22) Filed: Aug. 15, 2023

(65) Prior Publication Data
US 2024/0067163 A1 Feb. 29, 2024

(30) Foreign Application Priority Data
Aug. 24, 2022 (DE) .......................... 102022121345.5

(51) Int. Cl.
*B60W 30/06* (2006.01)
*B62D 15/02* (2006.01)

(52) U.S. Cl.
CPC ......... *B60W 30/06* (2013.01); *B60W 2300/14* (2013.01); *B60W 2554/80* (2020.02); *B60W 2556/65* (2020.02); *B60W 2756/10* (2020.02)

(58) Field of Classification Search
None
See application file for complete search history.

(56) References Cited

U.S. PATENT DOCUMENTS

| 8,618,955 | B2 | 12/2013 | Baker | |
|---|---|---|---|---|
| 2018/0032821 | A1* | 2/2018 | Lavoie | G06V 10/44 |
| 2019/0071088 | A1* | 3/2019 | Hu | B60W 30/18036 |
| 2020/0276989 | A1* | 9/2020 | Garcia | G01S 19/42 |
| 2023/0027627 | A1* | 1/2023 | Schmitt | G06V 10/82 |
| 2023/0123587 | A1* | 4/2023 | Jatt | B60W 30/06 |
| | | | | 701/23 |

FOREIGN PATENT DOCUMENTS

| DE | 102009032542 A1 | 1/2011 | | |
|---|---|---|---|---|
| DE | 102012019234 A1 | 4/2014 | | |
| DE | 102017116565 A1 | 2/2018 | | |
| DE | 112017004858 T5 | 6/2019 | | |
| EP | 3072709 A1 | 9/2016 | | |
| GB | 2512897 A | * | 10/2014 | B60Q 9/002 |

* cited by examiner

*Primary Examiner* — Madison R. Inserra
(74) *Attorney, Agent, or Firm* — Frank Lollo; Price Heneveld LLP

(57) ABSTRACT

A method for maneuvering a vehicle having a trailer coupling in the region of a parking space is provided, wherein the vehicle has at least a first sensor and a second sensor and a control device, wherein it is detected whether an object is disposed in the region of the back of the vehicle, whether the object affects the parking behavior of the vehicle and whether the field of view of at least one sensor is blocked by the object. A vehicle for carrying out the method is further provided.

14 Claims, 4 Drawing Sheets

METHOD FOR MANEUVERING A VEHICLE HAVING A TRAILER COUPLING IN A PARKING SPACE

CROSS-REFERENCE TO RELATED APPLICATION

This application claims foreign priority benefits under 35 U.S.C. § 119(a)-(d) to German Application No. 102022121345.5 filed Aug. 24, 2022, which is hereby incorporated by reference in its entirety.

FIELD OF THE DISCLOSURE

The present disclosure generally relates to a method for performing a parking maneuver by a vehicle having a trailer coupling and to a vehicle for carrying out the method.

BACKGROUND OF THE DISCLOSURE

Active parking assist systems are generally known and frequently implemented in motor vehicles. Parking assistance algorithms are used that are suitable for the vehicle. Trailer couplings, especially extended trailer couplings for caravans, and the like, and for trailers themselves, may involve modifications which can complicate the algorithms. Other pieces of equipment may also be disposed in the rear region, for example, bicycle racks. In some countries, towbars, for example, are connected to a coupling adapter without the need for an electrical connection. In such cases, an algorithm of the parking assist system may be set up such that it is assumed that the tow-bar is always present. However, this may result in a limitation in terms of the parking options and parking maneuvers because some parking spaces into which the vehicle would fit without the tow-bar may not be offered to the vehicle, or more movements than necessary may be required to park the vehicle. Even if a special circuit is used for tow-bars, no information is typically provided to the vehicle, if the tow-bar is extended. It is further possible that drivers may trim a trailer coupling with decorative elements, which are electrically connected. The vehicle logic may assume that a trailer is connected to the trailer coupling, which may prevent the parking assist system from being used.

It would be desirable to make the region of a trailer coupling available dynamically to a parking assist system of a vehicle.

SUMMARY OF THE DISCLOSURE

According to a first aspect of the present disclosure, a method for maneuvering a vehicle having a trailer coupling in a region of a parking space is provided. The vehicle has a first sensor and a second sensor and a control device connected to the first and second sensors. The method comprising the steps of starting up the vehicle and checking whether the vehicle has not been moved over a defined period of time prior to start-up, checking whether an object is disposed in a region of the back of the vehicle, acquiring dimensions of the object, checking whether the object changes a vehicle geometry so that a first trajectory calculated for parking the vehicle without the object is exceeded, calculating a second trajectory taking into account the dimensions of the object, performing a parking maneuver along the calculated second trajectory, and checking whether a field of view of at least one of the first and second sensors is blocked by the object.

Embodiments of the first aspect of the disclosure can include any one or a combination of the following features:
 if it is determined that the first sensor or the second sensor is blocked, the input of the corresponding sensor is disregarded by the control device;
 the parking maneuver is continued if the input of the second sensor or of the first sensor is sufficient to perform the parking maneuver along the second trajectory;
 the acquired dimensions are compared with known vehicle configurations which are stored in a cloud or in a memory device in the vehicle;
 stored vehicle configurations with a similarity in a range of from 80% to 100% are taken into account;
 the acquired dimensions are recorded in conjunction with the calculated second trajectory and the performed parking maneuver and are uploaded to the cloud and/or a device in the vehicle;
 vehicle dimensions are inputted by way of a human-machine interface if all the sensors are blocked;
 the first and second sensors comprise one or more of an ultrasonic sensor, a camera, a radar device, a lidar device, load sensors, and/or tire pressure sensors; and
 sensor data from other vehicles or devices of the infrastructure are used by the vehicle, the sensor data being obtained by vehicle-to-vehicle communication or by vehicle-to-infrastructure communication.

According to a second aspect of the present disclosure, a vehicle comprises a trailer coupling, a first sensor, a second sensor, and a control device connected to the sensors. The control device is configured to perform a method for maneuvering the vehicle. The method comprises the steps of starting up the vehicle and checking whether the vehicle has not been moved over a defined period of time prior to start-up, checking whether an object is disposed in a region of the back of the vehicle, acquiring dimensions of the object, checking whether the object changes a vehicle geometry so that a first trajectory calculated for parking the vehicle without the object is exceeded, calculating a second trajectory taking into account the dimensions of the object, performing a parking maneuver along the calculated second trajectory, and checking whether a field of view of at least one of the first and second sensors is blocked by the object.

Embodiments of the second aspect of the disclosure can include any one or a combination of the following features:
 if it is determined that the first sensor or the second sensor is blocked, the input of the corresponding sensor is disregarded by the control device;
 the parking maneuver is continued if the input of the second sensor or of the first sensor is sufficient to perform the parking maneuver along the second trajectory;
 the acquired dimensions are compared with known vehicle configurations which are stored in a cloud or in a memory device in the vehicle;
 stored vehicle configurations with a similarity in a range of from 80% to 100% are taken into account;
 the acquired dimensions are recorded in conjunction with the calculated second trajectory and the performed parking maneuver and are uploaded to the cloud and/or a device in the vehicle;
 vehicle dimensions are inputted by way of a human-machine interface if all the sensors are blocked;
 the first and second sensors comprise one or more of an ultrasonic sensor, a camera, a radar device, a lidar device, load sensors, and/or tire pressure sensors; and sensor data from other vehicles or devices of the infrastructure are used by the vehicle, said sensor data being obtained by vehicle-to-vehicle communication or by vehicle-to-infrastructure communication.

These and other aspects, objects, and features of the present invention will be understood and appreciated by those skilled in the art upon studying the following specification, claims, and appended drawings.

BRIEF DESCRIPTION OF THE DRAWINGS

The invention will be explained in greater detail with reference to the figures, in which.

DETAILED DESCRIPTION OF THE PREFERRED EMBODIMENTS

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
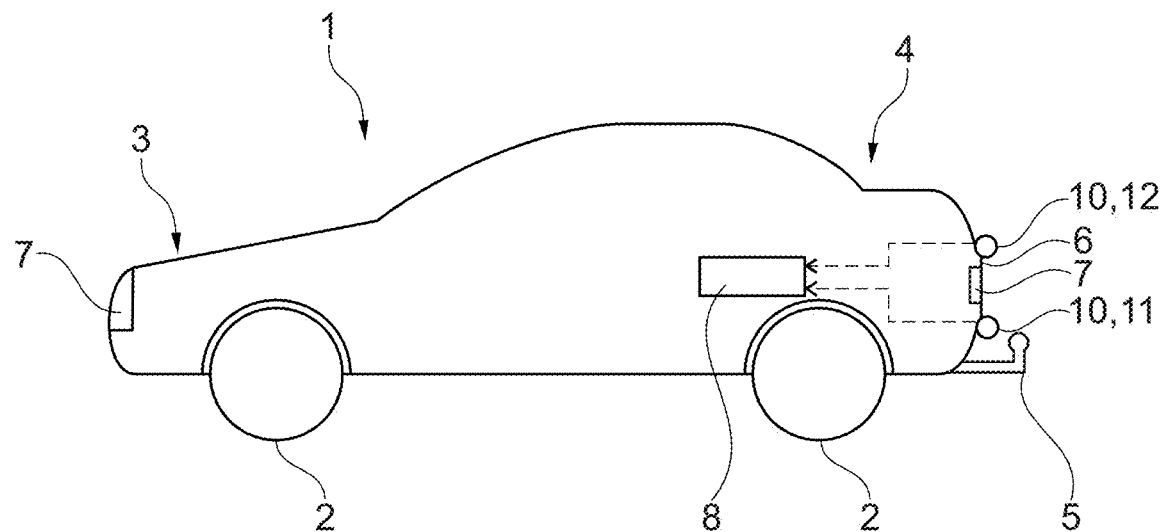
FIG. 1 is a side view of an embodiment of a vehicle having a trailer coupling and parking assist controls.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle and a method for maneuvering a vehicle having a trailer coupling in a parking space. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error, and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In the different figures, identical parts are always provided with the same reference signs, for which reason these parts are generally also described only once.

Referring to FIG. 1, a motor vehicle 1 is depicted as a passenger car, e.g., a saloon, with four wheels 2, according to one example. The motor vehicle 1 may include other types of vehicles. The vehicle 1 has a front region 3 and a rear region 4. A trailer coupling 5 is arranged in the rear region 4 of the vehicle 1. For monitoring the area situated to the rear of the vehicle 1, that is to say the area situated in the direction of travel of the vehicle 1 when the vehicle is reversing, a number of sensors 10 are arranged at the back 6 of the vehicle 1. The vehicle 1 further has lighting devices 7 for exterior lighting. A control device 8 is connected to or in communication with the sensors 10.

Figure 2:
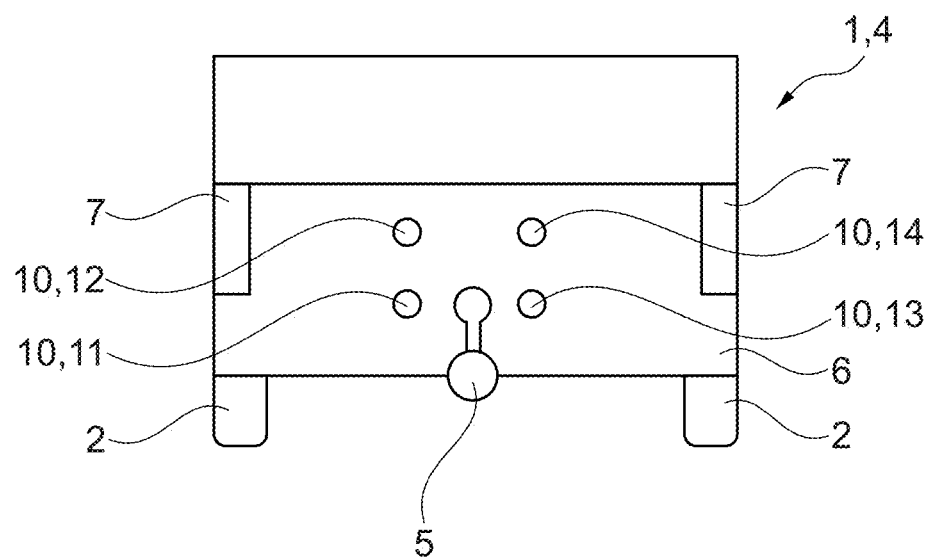
FIG. 2 is a rear view of the rear region of the embodiment of the vehicle according to FIG. 1.

In order to illustrate the position of the sensors 10, the back of the vehicle 1 is shown in FIG. 2. The sensors 10 include an ultrasonic sensor 11, a camera 12, a radar device 13, and a lidar device 14, without being limited thereto, that is to say further sensors can be arranged in or on the vehicle 1. The ultrasonic sensor 11 is shown in this example arranged centrally in the lower region of the back 6 of the vehicle 1. The camera 12 is arranged centrally in the upper region of the back 6 of the vehicle 1. The radar device 13 and the lidar device 14 are arranged on the right-hand side of the back 6 of the vehicle 1, wherein the radar device 13 is arranged in the lower region and the lidar device 14 is arranged in the upper region. The positions of the sensors 10 are shown and described herein according to one example. It should be appreciated that the sensors 10 may also be arranged in other positions. It should be appreciated that further sensors may also be used.

Figure 3:
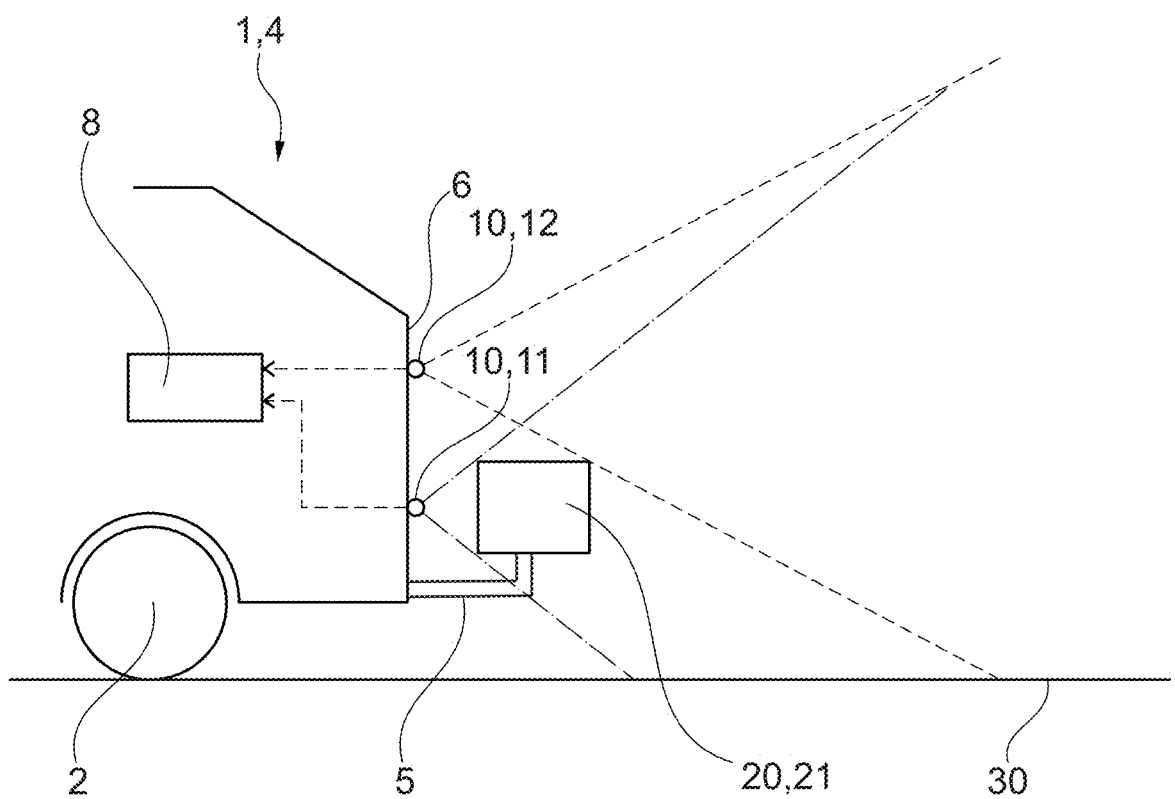
FIG. 3 is a side view of the rear region of the embodiment of the vehicle according to FIG. 1.

FIG. 3 shows a side view of the rear region 4 of the vehicle 1. In order to illustrate the action of the sensors 10, the fields of view of the ultrasonic sensor 11 (dot-and-dash line) and of the camera 12 (broken line) are shown. The vehicle 1 is illustrated on a road 30.

Unlike the vehicle as illustrated in FIGS. 1 and 2, an additional object 20, namely a bicycle rack 21 for example, is disposed on the trailer coupling 5 in FIG. 3. The bicycle rack 21 conceals part of the lower region of the rear or back 6 of the vehicle 1. In one example, the bicycle rack 21 may, therefore, interfere with the field of view of the ultrasonic sensor 11 and the field of view of the radar device 13. The ultrasonic sensor 11 and the radar device 13 may thus be blocked in terms of the respective ultrasonic and radar sensing action. The fields of view of the camera 12 and of the lidar device 14 are not impaired by the bicycle rack 21 in this example. The control device 8 is configured to decide whether the fields of view of the camera 12 and of the lidar device 14 are sufficient to complete a planned parking maneuver for the vehicle 1.

Figure 4:
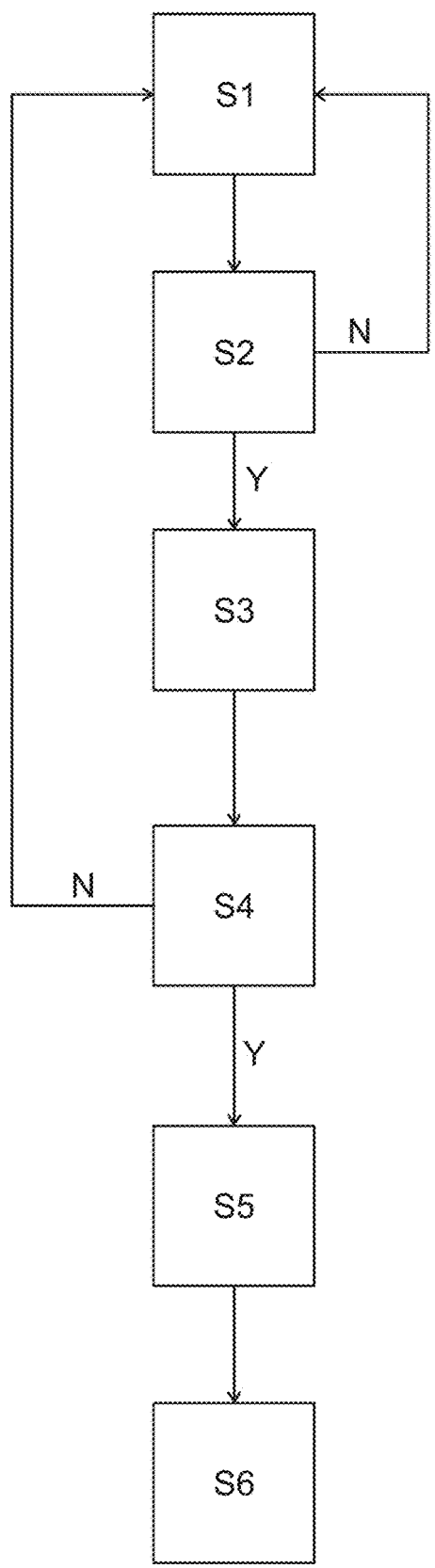
FIG. 4 is a flow diagram of an embodiment of a method for maneuvering the vehicle.

One embodiment of a method for maneuvering the vehicle 1 in a parking space is shown in FIG. 4. The method includes a first step S1 in which the vehicle is started up. In this step, the period of time that has passed since the vehicle was parked is checked. An in-vehicle chronometer, for example, may be used for this purpose. A time interval is used as a threshold for which it is assumed that an object could in that time have been disposed on the trailer coupling 5 or in the region of the back 6 of the vehicle 1. Some bicycle racks can, for example, also be disposed by use of corresponding devices at the tailgate of a passenger car in the form of an estate car. The time interval in this exemplary embodiment may be 10 minutes, for example. Shorter or longer time intervals can also be set if this appears to be expedient according to the vehicle 1 or the technique used.

In a second step S2 of the method, a check is performed to detect whether an object 20 is connected to the trailer coupling 5. One or more of the sensors 10 may be used to detect an object connected to the trailer coupling. If there is no object detected (N, No), the method returns to step S1 again or is terminated. If an object is detected (Y, Yes), the method continues to a third step S3.

In the third step S3 of the method, the dimensions of the object 20 are measured or otherwise acquired. The sensors 10 are used for this purpose. The measured values are transmitted to the control device 8. It is here checked whether the field of view of at least one sensor 10 is blocked by the object 20. In the configuration shown in FIG. 3, the ultrasonic sensor 11 and the radar device 13 are blocked in terms of their sensing action, that is to say their field of view is restricted. By use of the control device 8, it is determined that the sensor action of the camera 12 and of the lidar device 14 is sufficient to detect the area to the rear or back 6 of the vehicle 1 and to monitor reversing of the vehicle 1.

In a fourth step S4 of the method, the control device 8 checks whether the object 20 affects the parking behavior of the vehicle 1 such that a first trajectory T1 calculated for the actual vehicle is exceeded. If the first trajectory T1 is not exceeded (N), that is to say it can also be used with the object 20, the method returns to step S1.

If the first trajectory T1 is exceeded (Y), a second trajectory T2 is calculated by the control device 8 in a fifth step S5, taking into account the dimensions of the object 20. The second trajectory T2 is calculated such that suitable parking spaces can be detected by the vehicle 1.

In a sixth step S6 of the method, a parking maneuver is performed along the calculated second trajectory T2 and the vehicle 1 is stopped in a parked position.

Figure 5:
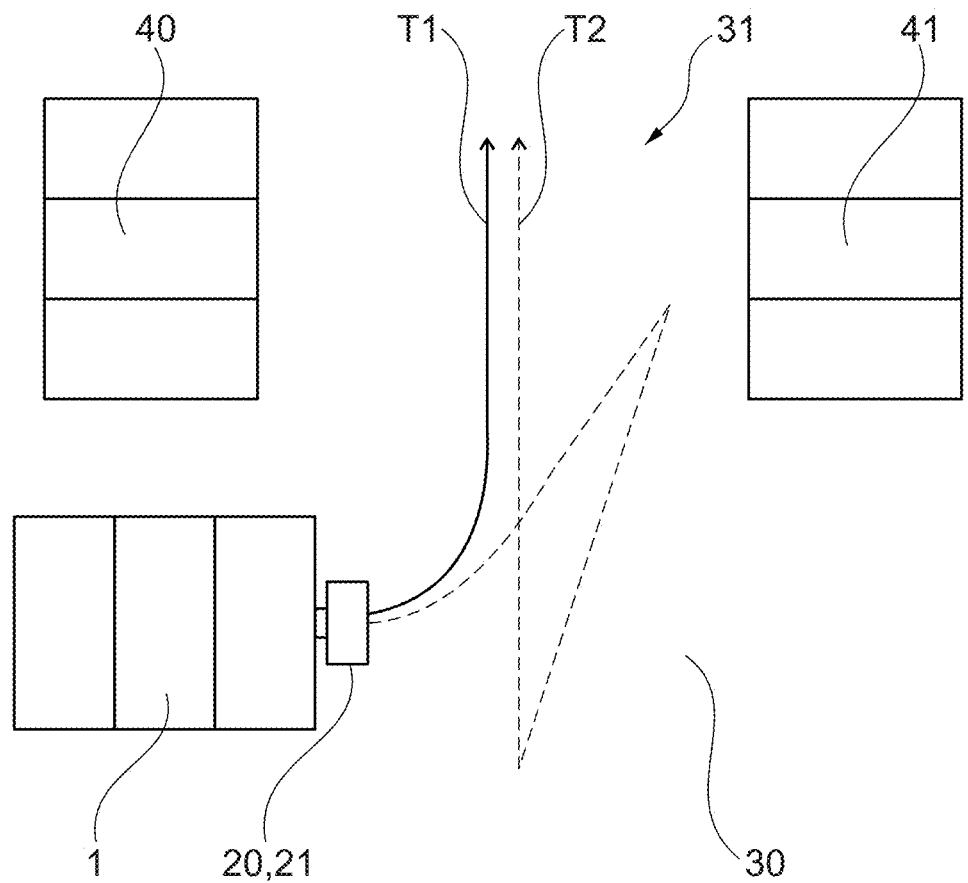
FIG. 5 is a schematic illustration of a vehicle according to FIG. 1 in a parking space situation.

A parking maneuver corresponding to the method explained in FIG. 4 is illustrated schematically in FIG. 5. The vehicle 1 is controlled to be steered into a parking space 31 between a first vehicle 40 bordering the parking space 31 and a second vehicle 41 bordering the parking space 31. The first trajectory T1 (solid line) corresponds to a maneuver in a configuration of the vehicle 1 without an additional object 20 in the region of the trailer coupling 5.

The second trajectory T2 (broken line) corresponds to a maneuver in a configuration of the vehicle 1 with an additional object 20 in the region of the trailer coupling 5. In order that the second trajectory T2 can be planned and implemented, the sensor action, that is to say the field of view of the camera 12 and the field of view of the lidar device 14, must be sufficient. If all the sensors are blocked in terms of their action, the driver is informed that driver assist from the control device 8 for reversing of the vehicle 1 is not possible. In this case, the driver can himself input a trajectory for parking, for example, by way of a suitable human-machine interface, or he or she can optionally seek instruction from a passenger or other suitable person.

A first aspect of the disclosure relates to a method for maneuvering a vehicle having a trailer coupling in the region of a parking space. The vehicle has at least a first and at least a second sensor and a control device connected to the sensors, the method comprises the steps:
  starting up the vehicle and checking whether the vehicle has not been moved over a defined period of time prior to start-up;
  checking whether an object is disposed in the region of the back of the vehicle,
  acquiring the dimensions of the object;
  checking whether the object changes the vehicle geometry so that a first trajectory calculated for parking the vehicle without the object is exceeded;
  calculating a second trajectory taking into account the dimensions of the object; and
  performing a parking maneuver along the calculated second trajectory, characterized in that it is checked whether the field of view of at least one sensor is blocked by the object.

According to a second aspect of the present disclosure, a method advantageously reduces the outlay required for programming and setting up a parking assist system. It is checked whether the vehicle geometry is changed, whereby a modified trajectory is required for a parking maneuver.

Starting up the vehicle refers to starting the operating systems which are necessary for moving the vehicle, that is to say the electrics of the vehicle. In a vehicle with an internal combustion engine, it means, for example, inserting the ignition key and turning it into a first position, whereupon the functions of the vehicle are usually displayed in the dashboard region.

The defined period of time in which the vehicle is not moved prior to start-up refers to the time which is usually required to dispose or place an object on the trailer coupling or the back of the vehicle. It may be defined, for example, as 20 minutes, more preferably 15 minutes and particularly preferably 10 minutes.

Preferably, if it is determined that the first sensor or the second sensor is blocked, the input of the corresponding sensor is disregarded by the control device (the OR option makes it clear that the second sensor or the first sensor is not blocked). The first sensor is arranged, for example, in the middle region of the outside of the rear of the vehicle, that is to say, for example, above the trailer coupling. If the action of the first sensor is restricted by the object, the region situated to the rear of the vehicle can no longer be detected efficiently. In order to eliminate false reports, sensor measurements of the first sensor are in this case disregarded.

Preferably, the parking maneuver is continued if the input of the second sensor or of the first sensor is sufficient to perform the parking maneuver along the second trajectory (i.e., if the first or second sensor is blocked). Advantageously, it is here decided whether the input of the remaining sensors is sufficient if the field of view of a number of sensors is restricted or cannot be used. For example, a camera in the upper rear region may still provide a sufficient field of view when an ultrasonic sensor in the lower rear region is restricted. This feature can advantageously also be implemented in a parking assist system, so that existing sensors can be used for a distance measurement instead of the sensors not being used or the parking assist system being switched off.

It is further preferred if the acquired dimensions are compared with known vehicle configurations for which parking space sizes and/or parking trajectories are stored in a cloud or in a memory device in the vehicle. In other words, the acquired modified vehicle geometry is compared with known configurations. Vehicle configurations which have a specific similarity with the acquired configuration of the vehicle are then acquired.

Stored vehicle configurations with a similarity in the range of, for example, from 60% to 100%, preferably in the range of from 70% to 100% and particularly preferably from 80% to 100% may be taken into account.

Furthermore, the acquired dimensions are preferably recorded in conjunction with the calculated second trajectory and the performed parking maneuver and are uploaded to the cloud and/or stored in a device in the vehicle. This is particularly advantageous if it has not been possible to find a known configuration for the new configuration. It is, however, also advantageous to compare the trajectory of the current parking maneuver with known parking maneuvers.

Furthermore, the dimensions of the object are preferably inputted by way of a human-machine interface if all the sensors arranged in the rear region of the vehicle are blocked. Advantageously, a configuration can then be acquired, so that a trajectory for a parking maneuver can be calculated.

In one embodiment, the sensors are selected from the group comprising cameras, ultrasonic sensors, radar devices, lidar devices, load sensors, and/or tire pressure sensors.

In the method, sensor data from other vehicles or devices of the infrastructure may be used by the vehicle, the sensor data being obtained by vehicle-to-vehicle communication or by vehicle-to-infrastructure communication.

A second aspect of the disclosure relates to a vehicle having at least a first sensor and at least a second sensor and a control device connected to the sensors, in which the control device is configured to control the method for maneuvering the vehicle according to the disclosure.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A method for maneuvering a vehicle having a trailer coupling in a region of a parking space, wherein the vehicle has a first sensor and a second sensor and a control device connected to the first and second sensors, the method comprising the steps:
   starting up the vehicle and checking whether the vehicle has not been moved over a defined period of time prior to start-up;
   checking whether an object is disposed in a region of the back of the vehicle;
   acquiring dimensions of the object, wherein the acquired dimensions are compared with known vehicle configurations which are stored in a cloud or in a memory device in the vehicle, and wherein stored vehicle configurations with a similarity in a range of 80% to 100% are taken into account;
   checking whether the object changes a vehicle geometry so that a first trajectory calculated for parking the vehicle without the object is exceeded;
   calculating a second trajectory taking into account the dimensions of the object;
   performing a parking maneuver along the calculated second trajectory; and
   checking whether a field of view of at least one of the first and second sensors is blocked by the object.

2. The method according to claim 1, wherein, if it is determined that the first sensor or the second sensor is blocked, the input of the corresponding sensor is disregarded by the control device.

3. The method according to claim 2, wherein the parking maneuver is continued if the input of the second sensor or of the first sensor is sufficient to perform the parking maneuver along the second trajectory.

4. The method according to claim 1, wherein the acquired dimensions are recorded in conjunction with the calculated second trajectory and the performed parking maneuver and are uploaded to the cloud and/or a device in the vehicle.

5. The method according to claim 1, wherein vehicle dimensions are inputted by way of a human-machine interface if all the sensors are blocked.

6. The method according to claim 1, wherein the first and second sensors comprise one or more of an ultrasonic sensor, a camera, a radar device, a lidar device, load sensors, and/or tire pressure sensors.

7. The method according to claim 6, wherein sensor data from other vehicles or devices of an infrastructure are used by the vehicle, the sensor data being obtained by vehicle-to-vehicle communication or by vehicle-to-infrastructure communication.

8. A vehicle comprising:
   a trailer coupling;

a first sensor;
a second sensor; and
a control device connected to the sensors, wherein the control device is configured to perform a method for maneuvering the vehicle, the method comprising the steps of:
  starting up the vehicle and checking whether the vehicle has not been moved over a defined period of time prior to start-up;
  checking whether an object is disposed in a region of the back of the vehicle;
  acquiring dimensions of the object, wherein the acquired dimensions are compared with known vehicle configurations which are stored in a cloud or in a memory device in the vehicle, and wherein stored vehicle configurations with a similarity in a range of 80% to 100% are taken into account;
  checking whether the object changes a vehicle geometry so that a first trajectory calculated for parking the vehicle without the object is exceeded;
  calculating a second trajectory taking into account the dimensions of the object;
  performing a parking maneuver along the calculated second trajectory; and
  checking whether a field of view of at least one of the first and second sensors is blocked by the object.

9. The vehicle according to claim 8, wherein, if it is determined that the first sensor or the second sensor is blocked, the input of the corresponding sensor is disregarded by the control device.

10. The vehicle according to claim 9, wherein the parking maneuver is continued if the input of the second sensor or of the first sensor is sufficient to perform the parking maneuver along the second trajectory.

11. The vehicle according to claim 8, wherein the acquired dimensions are recorded in conjunction with the calculated second trajectory and the performed parking maneuver and are uploaded to the cloud and/or a device in the vehicle.

12. The vehicle according to claim 8, wherein vehicle dimensions are inputted by way of a human-machine interface if all the sensors are blocked.

13. The vehicle according to claim 8, wherein the first and second sensors comprise one or more of an ultrasonic sensor, a camera, a radar device, a lidar device, load sensors, and/or tire pressure sensors.

14. The vehicle according to claim 13, wherein sensor data from other vehicles or devices of an infrastructure are used by the vehicle, said sensor data being obtained by vehicle-to-vehicle communication or by vehicle-to-infrastructure communication.

* * * * *